United States Patent [19]

Meiners

[11] 4,173,112
[45] Nov. 6, 1979

[54] APPARATUS FOR WRAPPING A COVER MATERIAL AROUND ROUND BALES

[75] Inventor: Elmo R. Meiners, Anchor, Ill.

[73] Assignee: M & W Gear Company, Gibson City, Ill.

[21] Appl. No.: 928,507

[22] Filed: Jul. 27, 1978

[51] Int. Cl.$^2$ ............................................ A01D 39/00
[52] U.S. Cl. .................................. 56/341; 56/DIG. 2
[58] Field of Search ................ 56/16.4, 341, 342, 343, 56/DIG. 2; 100/88, 76, 5

[56] References Cited

U.S. PATENT DOCUMENTS

| | | | |
|---|---|---|---|
| 2,035,705 | 3/1936 | Kaser | 56/341 |
| 3,205,898 | 9/1965 | Sprague | 130/20 |
| 3,427,790 | 2/1969 | Flittie | 56/341 |
| 3,606,723 | 9/1971 | Clark | 56/27.5 |
| 3,837,506 | 9/1974 | Drieer | 130/20 |
| 3,911,641 | 10/1975 | Miller et al. | 100/5 |
| 4,024,804 | 5/1977 | Hanson | 56/341 |

FOREIGN PATENT DOCUMENTS 245249 1/1963 Australia ........................... 56/DIG. 2
2705101 8/1978 Fed. Rep. of Germany ............. 56/341

Primary Examiner—Louis G. Mancene
Assistant Examiner—Paul J. Hirsch
Attorney, Agent, or Firm—Allegretti, Newitt, Witcoff & McAndrews

[57] ABSTRACT

A mechanism for wrapping a plastic cover sheet about a round bale of hay is incorporated in a round bale forming machine. The mechanism includes an arbor for receipt of a roll of wrapping material. The arbor is positioned in the bale forming machine forward of the bale forming mechanism. The wrapping material is fed from the roll and wraps about the formed round bale as the baling machine moves forward. After the wrapping material encircles the bale, it is cut. The cut end is overlapped on the wrapped bale and glued thereto. Various wrapping material feed and cut off mechanisms are disclosed.

9 Claims, 7 Drawing Figures

APPARATUS FOR WRAPPING A COVER MATERIAL AROUND ROUND BALES

BACKGROUND OF THE INVENTION

This invention relates to an improved bale forming machine and more particularly to a bale forming machine of the type for forming round bales.

Baling of hay and similar cut field crops is an important way for storing, transporting or preserving such materials. Various types of baling equipment are available and have been disclosed in various patents. Recently, mechanisms for forming and maintaining round bales have become increasingly popular. Patents disclosing such mechanisms include the following:

| Pat. No. | Inventor | Title | Issue Date |
| --- | --- | --- | --- |
| 3,205,898 | Sprague | Method and Apparatus For Storing Plant Materials | 9/14/65 |
| 3,534,537 | Biechele et al | Machine for Forming and Hauling Large Round Bales of a Fibrous Material | 10/20/70 |
| 3,641,754 | Austee | Grass and Leaf Packaging Machine | 2/15/72 |
| 3,894,484 | Gustey et al | Bale Wrapping Mechanism For Large Cylindrical Bales | 7/15/75 |
| 3,911,641 | Miller et al | Roll-Up Compressive Packaging Apparatus | 10/14/75 |
| 3,913,473 | Meiers | Bale Wrapping Mechanism For Large Cylindrical Bales | 10/21/75 |
| 4,018,391 | Jacobsen | Controlled Hay Bale Metering and Feeding Device | 4/19/77 |
| 4,019,309 | Lundell | Round Bale Forming Machine | 4/26/77 |
| 4,022,003 | Strausse et al | Controlling the Size of a Roll Core Formed in a Coop Material Roll Forming Machine | 5/10/77 |
| 4,022,120 | McAllister | Electrically Powered Twine Wrapper For For Round Bales | 5/10/77 |
| 4,024,804 | Hanson | Rotary Baling Machine With Twine Feeding Mechanism and Articulated Drive Assembly | 5/24/77 |

Generally, the referenced patents disclose round bale forming machines which include a bale forming mechanism that is transported through a field to simultaneously gather the hay or similar material and roll it into a generally cylindrical bale. The formed bale is held together most often by means of cord which extends about the bale and is tied off at its opposite ends.

Recently, it has been suggested that the round bale be retained within a plastic bag. This suggestion was set forth in the January-February, 1977 issue of "Farm Show" magazine. A more recent issue of "Farm Show" magazine in March, 1978 disclosed the concept of wrapping a protective strip of plastic material about the cylindrical surface of a round bale.

Various advantages flow from applying a plastic or wrapping material over the round bale. For example, the round bale may be more easily stored in fields without loss or deterioration in the quality of the outer layers of the material forming the bale. Additionally, the wrapping material tends to protect the round bale from scavengers and degradation from various other sources.

Heretofore, however, there has been no known mechanism or apparatus for simultaneously forming a round bale and enclosing that bale with a wrapping material. Benefits from such an apparatus or mechanism would include elimination of the extra step of wrapping the formed round bale. Additionally, it may be possible to use the wrapping material in lieu of the cord normally utilized to hold the round bale together. In view of these needs, the present invention was conceived.

SUMMARY OF THE INVENTION

Briefly, the invention is the improvement in a round bale forming machine having a bale forming mechanism of apparatus for applying a cover sheet over the round bale during the bale forming operation. The improved apparatus includes a roll storage arbor for the rolled sheet of wrapping material. The arbor is mounted on the bale forming machine forward of the bale forming mechanism. The wrapping material is uniformly dispensed from the arbor subsequent to formation of the round bale as the bale forming machine continues to move through the field. Wrapping material is then formed about the round bale. An appropriate length of the wrapping material is cut and overlapping ends of the wrapping material are attached.

Thus, it is an object of the present invention to provide an improved round bale forming machine which incorporates means for wrapping a formed round bale in a wrapping material to protect the bale and to simultaneously retain the integrity of the bale.

A further object of the present invention is to provide a material wrapping apparatus for a round baler machine which may be incorporated with existing round baler machines easily and inexpensively.

Still a further object of the present invention is to provide a mechanism for incorporation in existing round bale forming machines which will feed a desired amount of wrapping material about the formed round bale and then secure that wrapping material about the round bale.

Still a further object of the present invention is to provide a mechanism for incorporation with a round bale forming machine to wrap the formed round bale as the bale forming machine is continuously drawn through a field. The wrapping operation does not interrupt the movement of the bale forming machine.

One further object of the present invention is to provide an improved mechanism for incorporation in a round bale forming machine to wrap the bale with wrapping material which is of simple construction and which may be economically incorporated in a round bale forming machine.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENTS

The present invention is designed generally for incorporation with apparatus for forming a bale of hay or other cut material as a round bale. Previously cited references teach various apparatus or balers for the formation of such round bales. The mechanism of the present invention is incorporated with such apparatus by mounting the mechanism forward of the bale forming mechanism of such apparatus. It is also possible to separately mount the mechanism of the present invention on its own trailer and then position that trailer forward of the bale forming apparatus. However, the preferred embodiment of the invention incorporates the wrapping mechanism integrally with the bale forming apparatus.

Figure 1:
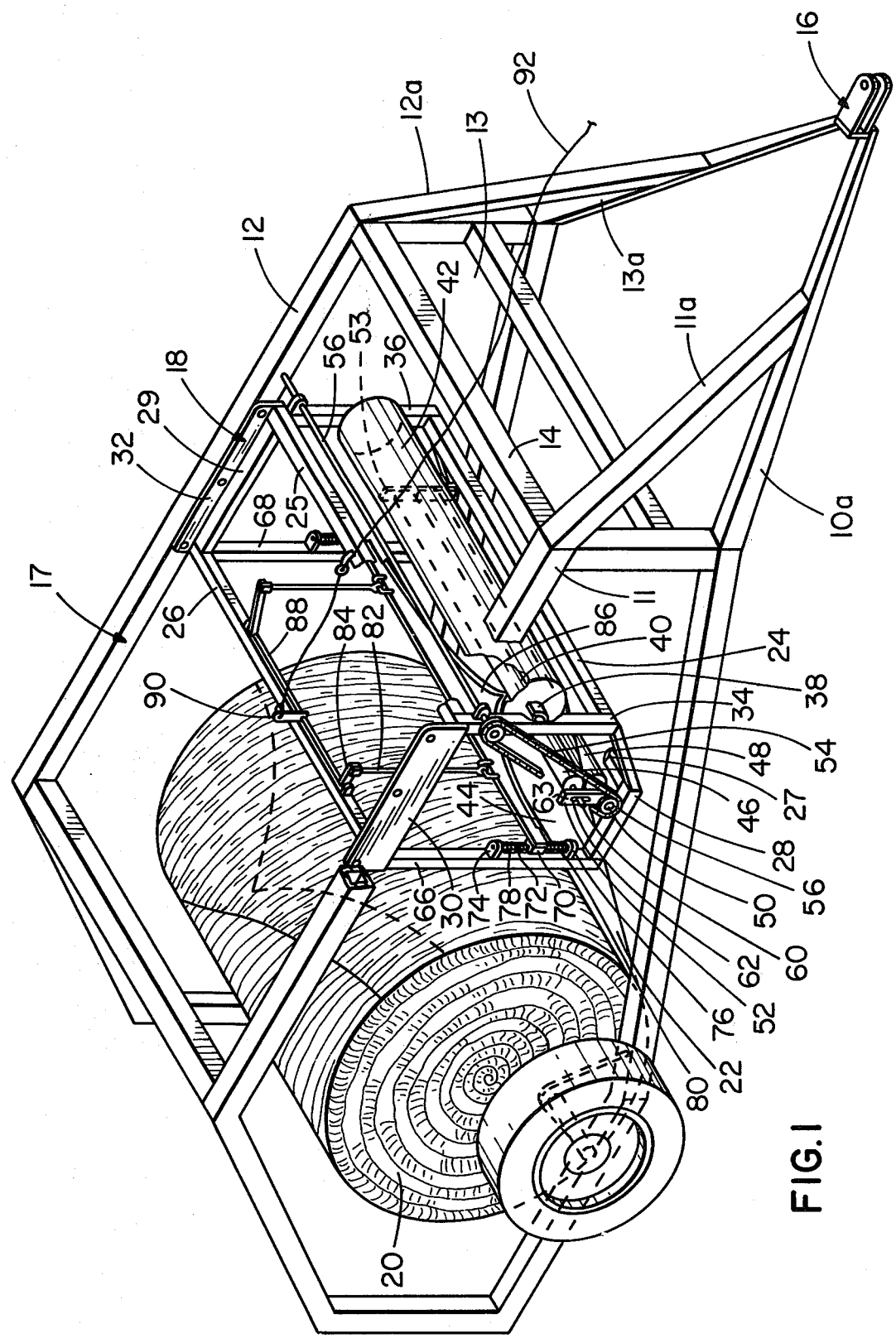
FIG. 1 is a perspective view of a first embodiment of the round bale wrapping device as incorporated with a typical round bale forming machine.

Referring, therefore, to FIG. 1, the frame structure of a round baler is illustrated as including four rearwardly extending frame members 10, 11, 12 and 13, which define the sides of the hay baler. The frame members 10–13 are rigidly interconnected and maintained in spaced relationship by means of cross frame members such as frame member 14. A series of frame bracket members 10a, 11a, 12a and 13a extend from frame members 10–13 respectively and connect with a tow bar or tongue 16.

The mechanism of the present invention is generally comprised of the bale cover applicator 18 which is suspended from round bale frame members 11 and 12 forward of section 17 of the round baler in which the round bale is formed. In FIG. 1 a round bale 20 is illustrated as having been formed by the round baler. Wrapping material 22 dispensed by the cover applicator 18 is illustrated as being partially applied to the roll or round bale 20.

The applicator 18 is comprised of a frame which includes cross members 24 through 27. The cross members 24 through 27 connect pentagonal side frame members 28 and 29. Opposed mounting plates 30 and 32 project from the frame members 28 and 29 respectively for attachment of the cover applicator 18 to the baler frame members 11 and 12 respectively.

Each pentagonal side frame member 28 and 29 includes an upright vertical forward post 34, 36 respectively. A U-shaped channel 38 is welded on the inside of each post 34 and 36. The channels 38 are in opposed relation so that a material support rod 40 may extend between the channels 38 of posts 34 and 36 and support a roll of cover material 42.

Typically the cover material roll 42 may be plastic, waterproof paper, cloth or foil. The width of the roll 42 is not a limiting feature of the invention. Generally the width of the roll 42 is slightly less than the width of the formed round bale 20. The roll 42 may be sectioned so that the round bale 20 will be provided with strips of material forming the roll 42 wrapped around the bale 20.

A lead end 44 of roll 42 is fed through opposed parallel rollers 46 and 48 extending between the side frame members 28 and 29. Drive roller 48 is mounted on a shaft 50 projecting from opposite ends of roller 48 through a mounting bracket 52 attached to frame member 28 and bracket 53 attached to frame member 29.

Roller 48 is driven by a drive chain 54 which drives sprocket 56 attached to shaft 50. The drive chain 54 is driven in response to a driven shaft 58 journalled in bearings on posts 34, 36 which, in turn, may be driven by an electric motor (not shown), a power take off from the vehicle pulling the round baler or by some other drive means for rotating the drive shaft 56.

Roller 46 is a biased idler roller which includes a shaft 60 extending in opposite directions from the ends of roller 46 through a slot 62 in bracket 52. A spring member 63 is positioned in slot 62 to engage the shaft 60 and bias the shaft 60 toward the shaft 50 thereby biasing idler roller 46 toward drive roller 48.

The lead end 44 of roll 42 is inserted between rollers 46 and 48 and is gripped and driven in response to rotation of the drive roller 48. In this manner removal of cover material from roll 42 is accurately controlled. Preferably the cover material 42 is fed about the bale 20 at the same speed that the roll 20 is being formed. This is the speed of movement of the baler in a forward direction. The lead end 44 is initially fed into the formed bale 20 so that the lead end 44 will be tightly gripped by the cut material. In this manner the lead end 44 is affixed to the bale 20 and will cover the bale 20 as the lead end 44 is pulled around the bale 20 as the bale 20 is being formed.

Figure 2:
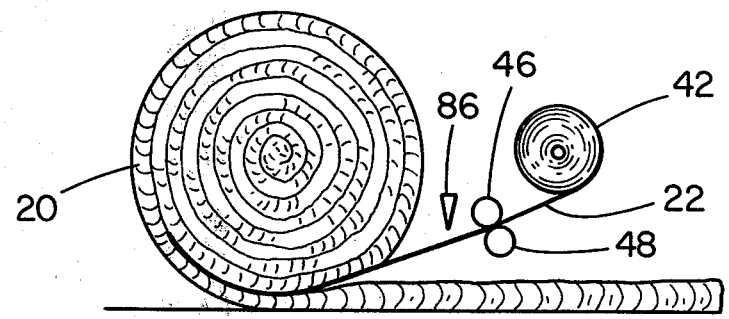
FIG. 2 is a side schematic view illustrating the operation of the device shown in FIG. 1.

Typically, therefore, referring to FIG. 1 the bale 20 will be formed by a rolling action in the clockwise direction. Referring to FIG. 2, as the lead end 44 is fed into the bale 20, the movement of the bale 20 in a clockwise sense causes the lead end 44 to be pulled about the bale. The drive roll 48 and idler roller 46 control the manner and rate at which the wrapping material 22 is fed into the bale 20 as it is formed. Note that a portion of the cut material is placed on both sides of the cover material.

When an appropriate amount of cover material 22 has been fed to cover the round bale 20, a cutting blade 64 is actuated. Blade 64 cuts the sheet 22 of material intermediate the round bale 20 and the material roll 42. Referring to FIG. 1, the cutoff mechanism is comprised of a shaped blade 64 which extends transverse to the direction which the cover material 22 moves. The blade 64 extends between the side frame members 28 and 29 and is connected at its opposite ends to upright posts 66 and 68 which form part of side frame members 28 and 29 respectively. In the embodiment shown each end of the blade 64 includes a bearing member 70 which is fitted on a vertical rod 72 attached to post 66. The rod 72 extends between support brackets 74 and 76. Biasing springs 78 and 80 are positioned on rod 72 between brackets 74, 76 and bearing 70 respectively. In this manner, the blade 64 is maintained in a spring supported neutral rest position absent any application of mechanical force to the blade 64.

To lower the blade into cutting relation with the wrapping material 22, a blade drive arm 82 attached to a lever arm 84 is driven in a downward direction by pivoting the lever arm 84 in a clockwise sense as viewed in FIG. 1. This causes the blade 64 to engage the wrapping material 22 and cut the end of the material 22 so that the cut end may be applied over the outside of the round bale. Note that the blade 64 has a pointed center or leading edge 86. This is to promote a shearing cutting action upon the wrapping material 22. The lever arm 84 in the embodiment of FIG. 1 is responsive to movement of a drive rod 88 mounted on cross member 26. Drive rod 88 is, in turn, responsive to lever arm 90 which is actuated by means of a pull rope 92. Alternatively, a hydraulic cylinder (not shown) may be mounted to actuate lever arm 90 or equivalent structure.

The cut end of the wrapped material is preferably affixed to outer covering forming the wrapping material 22 about the bale 20. Thus, there should be an overlap of the wrapping material 22. Preferably, this overlap is sealed by application of glue or alternatively, the covering material may be preglued. It is possible, however, to eliminate attachment of glue or other fastening means for the overlapped portion of the cover material 22 since the round bale 20 may be stored in the field and is unlikely to be moved. The weight of the bale 20 itself will insure that the cover material 22 is retained tightly wrapped about the round bale 20.

Figure 3:
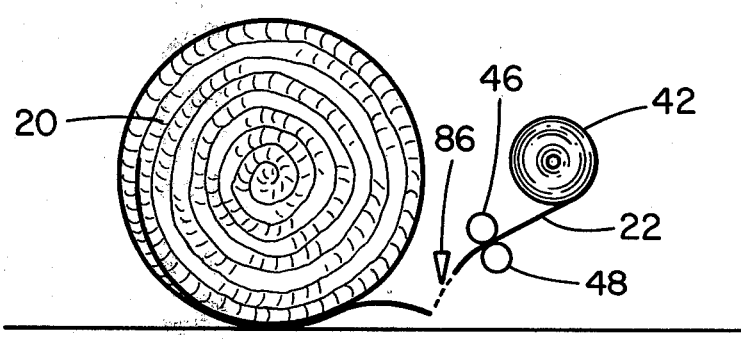
FIG. 3 is a side schematic view showing the further operation of the device shown in FIG. 1.
Figure 4:
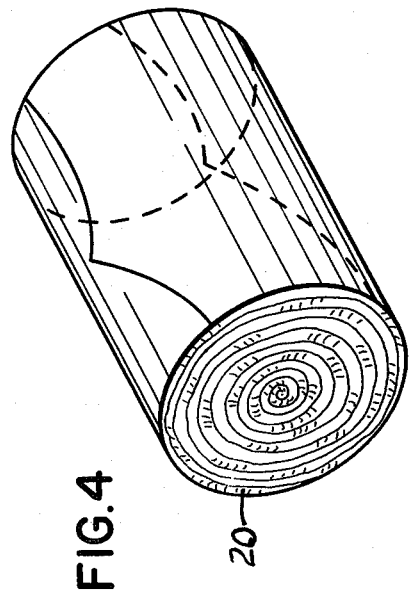
FIG. 4 is a perspective view of a typical round bale which has been wrapped and formed with the apparatus of the present invention.

FIGS. 2 and 3 illustrate schematically the sequence of operations for applying the wrapping material 22 about a formed round bale 20. As shown in FIG. 2 the free end 44 of the cover material is initially interleaved with the cut material forming the bale 20. Subsequently, the feeding of cut material into the bale is terminated. Simultaneously, the cover material 22 is continuously wrapped about the round bale 20 until there is an overlap as shown in FIG. 3. The wrapping material 22 is then cut and preferably sealed or glued on the overlapped region. FIG. 4 illustrates the final configuration of a round bale 20 formed and wrapped in accordance with the present invention.

Figure 5:
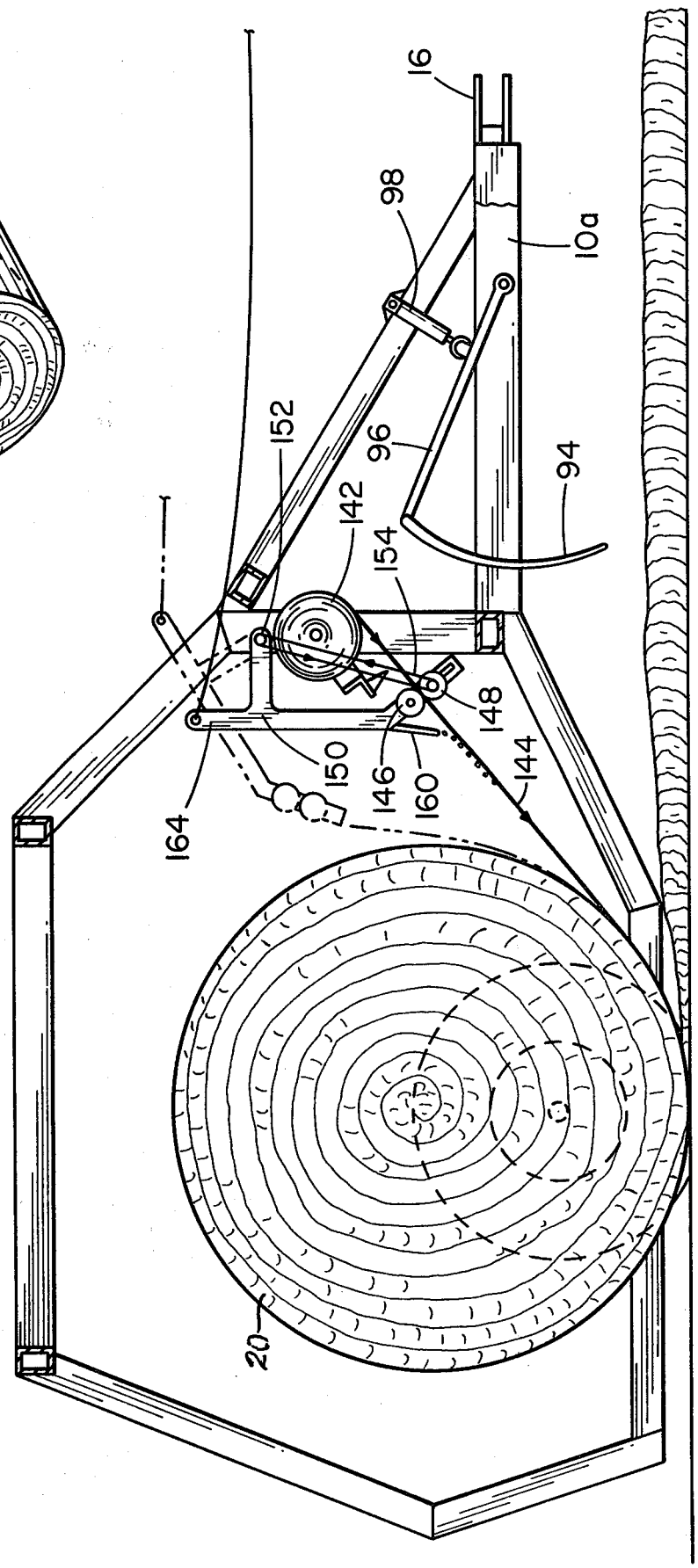
FIG. 5 is a side elevation of a second embodiment of the invention.

FIGS. 1 and 5 illustrate a mechanism for terminating the feeding of cut material into the bale forming mechanism so that the wrapping material 22 may be completely applied about the outside of the round bale 20. The mechanism for terminating feed of cut material comprises a rake 94 which is mounted on the tow bar frame bracket members 10a and 13a. The rake 94 is attached by means of a support arm 96 to the frame members 10a and 16a. A hydraulic cylinder 98 extends between the bracket members 11a, 12a and the bracket support arm 96. Operation of the cylinder 98 raises and lowers the rake 94.

Subsequent to insertion of the free end 44 of the wrapping material 22 into the bale 20, the rake 94 is lowered by operation of cylinder 98 to terminate gathering of cut material into the bale 20 being formed. In this manner the wrapping material 22 forms entirely about the outside of the round bale 20 as long as the rake 94 is retained in the lowered position. Subsequent to formation of the wrapped bale 20, the cylinder 98 is again actuated to raise the rake 94. Formation of an additional round bale is then commenced by continued forward movement of the baler apparatus in the field.

FIG. 5 also illustrates an alternative structure for the feed mechanism associated with the wrapping material. In FIG. 5 the feed mechanism is comprised of a drive roller 148 and idler roller 146 through which the end of the wrapping material 22 is fed. The rollers 146 and 148 are, however, mounted on a pivotal bracket assembly 150. The bracket assembly 150 pivots about a pivot connection 152. A drive chain 154 connects between the pivot point 152 and the drive roll 148. This connection is possible since the radial distance between those points is the same regardless of the position in which the bracket member 150 is pivoted. A glue applicator 160 projects downwardly from the bracket member 150 and dispenses glue onto a leading edge 144 from roll 142. A knife blade 164 is affixed rigidly to the baler.

The embodiment of FIG. 5 is operated between the position illustrated in bold lines in FIG. 5 and the phantom position; that is, the bracket 150 is pivoted about the pivot connection 152 to raise the rollers 146 and 148. This causes the leading edge 144 to engage against the blade 164 thereby cutting the wrapping material 22. The glue from glue applicator 160 insures that the overlapped portions of the wrapping material 22 become attached to each other.

Figure 6:
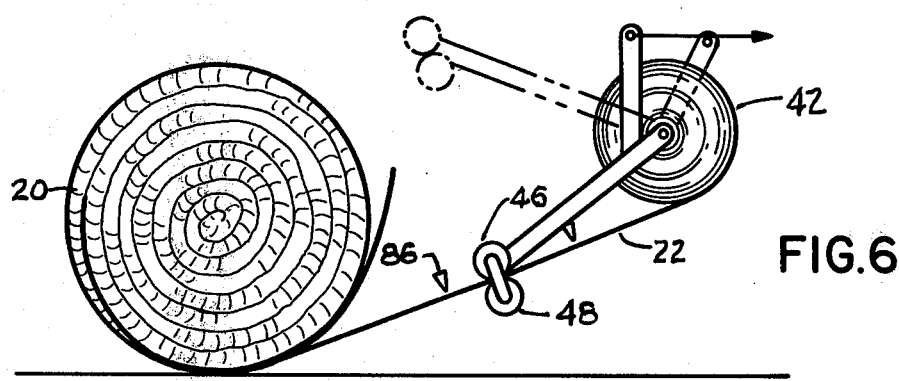
FIG. 6 is a schematic view illustrating the operation of the apparatus shown in FIG. 5.

FIG. 6 is a schematic of the arrangement set forth in FIG. 5. Note that the bracket 150 is operated in response to a lever arm 164 which may be pivoted by operation of a pull rope or a hydraulic cylinder or the like.

Figure 7:
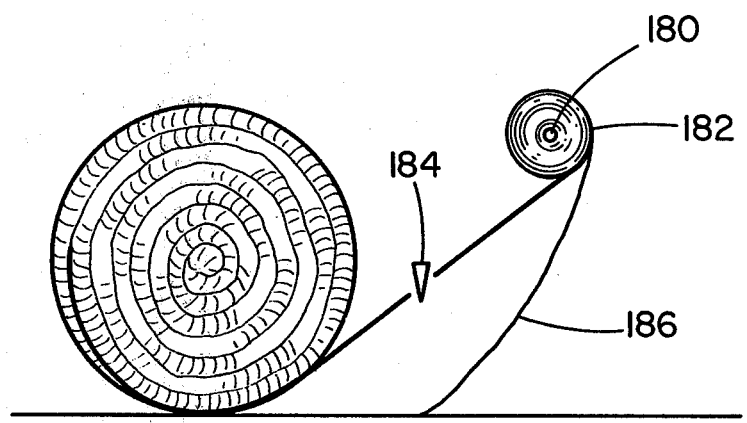
FIG. 7 is a schematic view of another embodiment of the invention.

FIG. 7 illustates schematically still another embodiment of the invention. In FIG. 7 the shaft 180 which receives the roll 182 of cover material is a powered shaft. Thus the shaft or arbor 180 is directly driven in order to unwrap the cover material and feed that material to the bale. A movable knife mechanism 184, for example as shown in FIG. 1, is positioned intermediate the covered bale and the roll 182. Note that when the free end 186 of the cover material is initially fed into the bale, it may be deposited directly on the ground with the cut material, such as hay, to thereby be incorporated in the bale as schematically illustrated in FIG. 2. Upon incorporation within the bale, the wrapping material is then subjected to greater tension and is removed from the roll 182 to cover the bale as previously described.

Various embodiments of the invention have been set forth in detail. The invention, however, is not limited to the specific embodiments illustrated. Alternatives are possible for incorporation with various types of round balers. Thus, the invention is to be limited only by the following claims and their equivalents.

What is claimed is:

1. In a round baler of the type having a bale forming mechanism for transport over a field of cut material to gather and form the material into a round bale, the improvement of apparatus for applying a cover sheet over the round bale during the bale forming operation, said improvement comprising in combination:

(a) a wrapping material roll storage member affixed to the baler forward of the bale forming mechanism, said roll storage member being oriented to position an end of a sheet of wrapping material on the roll member in the path of the cut material for wrapping the bale as the bale is being formed;

(b) drive means for the storage member for removing the sheet of wrapping material from the roll member and directing the end of said sheet along the ground for gathering by the bale forming mechanism about the outside surface of the formed bale;

(c) means forward of the bale forming mechanism for terminating flow of cut material to the bale forming mechanism;

(d) means for cutting the wrapping material intermediate the bale forming mechanism and the roll storage member; and (e) means for affixing a cut end of sheet material to a bale formed by the bale forming mechanism.

2. The improvement of claim 1 wherein said bale defines an axis of rotation during formation and wherein said roll storage member comprises a roll mounting assembly for supporting a cylindrical roll of wrapping material for rotation about a roll axis parallel to the axis of rotation of the round bale during formation of the round bale.

3. The improvement of claim 1 wherein the drive means comprise means for directly driving the roll storage member to thereby unroll wrapping material from the roll storage member.

4. The improvement of claim 1 wherein said drive means comprise opposed, parallel drive rolls on opposite sides of the wrapping material for gripping and removing the wrapping material from the roll storage member.

5. The improvement of claim 4 wherein one of said drive rolls is spring biased toward the other drive roll.

6. The improvement of claim 4 wherein said drive rolls are mounted on a bracket for movement about the roll storage member, whereby the wrapping materials may be positioned with respect to the formed bale by bracket movement.

7. The improvement of claim 1 wherein said means for terminating the flow of cut material comprise a rake member attached to the baler and means for positioning the rake member in the path of travel of the bale forming mechanism.

8. The improvement of claim 1 wherein the means for cutting comprises a blade member on the baler intermediate the roll storage member and the bale forming mechanism, and blade actuation means for imparting the blade against the wrapping material to cut the wrapping material.

9. The improvement of claim 1 wherein said means for affixing include adhesive discharge means for applying adhesive to the wrapping material whereby the wrapping material may be made to be attached about the formed bale.

* * * * *